No. 761,407.

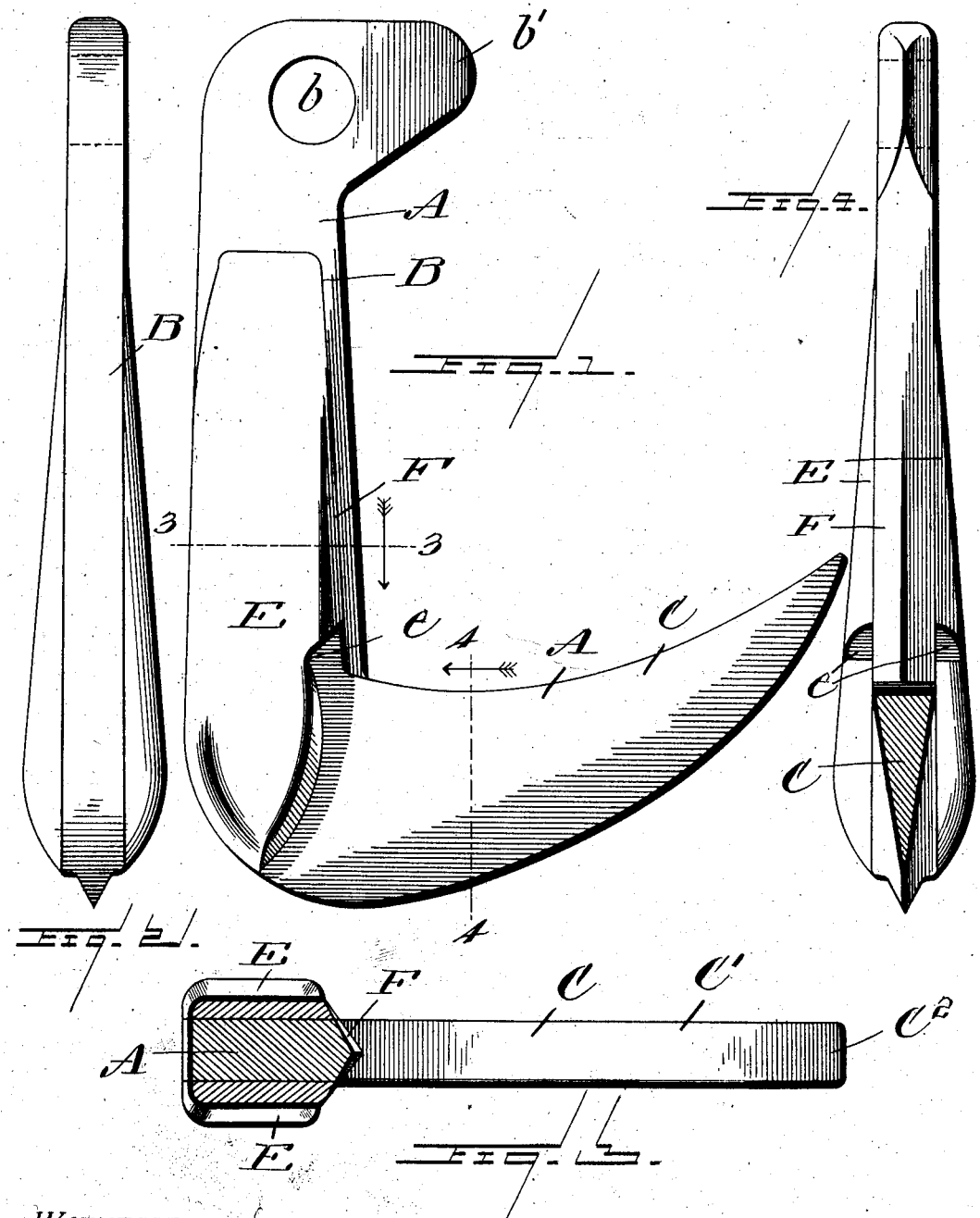

Patented May 31, 1904

UNITED STATES PATENT OFFICE.

HORACE M. ROUNDS, OF COLUMBUS TOWNSHIP, WARREN COUNTY, PENNSYLVANIA, ASSIGNOR OF ONE-HALF TO HERBERT P. STONE, OF WARREN, PENNSYLVANIA.

LOG GRAB-HOOK.

SPECIFICATION forming part of Letters Patent No. 761,407, dated May 31, 1904.

Application filed May 1, 1903. Renewed May 2, 1904. Serial No. 206,039. (No model.)

*To all whom it may concern:*

Be it known that I, HORACE M. ROUNDS, a citizen of the United States, residing in the township of Columbus, in the county of Warren and State of Pennsylvania, have invented certain new and useful Improvements in Log Grab-Hooks; and I do hereby declare the following to be a full, clear, and exact description of the invention, such as will enable others skilled in the art to which it appertains to make and use the same.

My invention relates to that class of grab-hooks which are employed in moving or hauling logs, and has for its special object to provide a hook of greater strength and durability and means for preventing such hooks from twisting sidewise after they have been driven into a log, and also means whereby they may be withdrawn from a log with greater ease than has heretofore been possible.

In order that my invention may be clearly understood, a full and exact description and illustration of the same have been given in the annexed specification and drawings.

In the drawings, Figure 1 is a side view of my improved hook. Fig. 2 is a rear view of the same. Fig. 3 is a horizontal sectional view on line 3 3, Fig. 1. Fig. 4 is a vertical sectional view on line 4 4, Fig. 1.

In the drawings like letters represent similar parts.

A in the drawings represents my hook, comprising a shank B and ordinary bill C. The bill C is of ordinary construction, being V-shaped in cross-section, as shown in Fig. 4, and having its upper edge $C'$ flat and of the same width throughout and provided with a sharp edge $C^2$ to facilitate the driving of the hook into a log. The shank B is enlarged on each side at E E and is provided with the usual eye through which the usual draft chain or rope may be secured. The hook is also provided with a spur $b'$ of suitable form to be driven into the log after the bill has been inserted to prevent the hook from twisting sidewise, thus loosening the grip of the bill C. The spur $b'$ is preferably elongated in the direction of the shank of the hook to give a broader side bearing; but this is not essential. The enlargements E E are of such construction as to greatly increase the pounding-surface for driving the bill as well as to greatly strengthen the entire hook. Suitable notches $e\ e$ are cut in the enlargements and adapted to receive or be engaged by the claw of a cant-hook or other implement for removing the hook from a log. The shank B is also suitably beveled at F F to permit any suitable inclined instrument, as a grab-skipper or claw of a cant-hook, to be forced under the shank to release the hook when it is desirable to remove the hook in that way. In such case the inclined or beveled faces act as cams and assist in the removal of the hook.

It will thus be seen that my improved grab-hook is strong and durable, that it retains its position when once driven into the log, and is easily disengaged and removed when no longer needed.

What I claim, and desire to secure by Letters Patent, is—

1. A grab-hook of the class designated, comprising a bill and a shank, said shank being provided with the usual eye and a spur adjacent thereto, substantially as and for the purpose described.

2. A grab-hook of the class designated, comprising a bill, a shank having suitable enlarged portions and a spur at the free end of said shank, substantially as and for the purpose described.

3. A grab-hook of the class designated, comprising a bill and a shank having side enlargements, the said shank having inclined cam-faces on the same side as the bill, substantially as and for the purpose specified.

4. A grab-hook of the class designated, comprising a bill, a shank provided with enlarged portions notched as described, substantially as and for the purpose described.

5. A log grab-hook of the class described, having a bill and a shank provided with enlarged portions notched as described and a spur adjacent to the eye of the grab-hook, substantially as described.

In testimony whereof I affix my signature in the presence of two witnesses.

HORACE M. ROUNDS.

Witnesses:
R. H. DAVIS,
W. H. ALLEN.